US011128554B1

(12) United States Patent
Wang et al.

(10) Patent No.: US 11,128,554 B1
(45) Date of Patent: Sep. 21, 2021

(54) INCREASING THROUGHPUT FOR MULTI-PHY NETWORKS

(71) Applicant: Cisco Technology, Inc., San Jose, CA (US)

(72) Inventors: Yinfang Wang, Shanghai (CN); Yajun Xia, Shanghai (CN); Feiliang Wang, Shanghai (CN); Chuanwei Li, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/265,046

(22) Filed: Feb. 1, 2019

(51) Int. Cl.
| H04L 12/26 | (2006.01) |
| H04B 3/54 | (2006.01) |
| H04L 12/18 | (2006.01) |
| H04W 72/12 | (2009.01) |
| H04W 84/18 | (2009.01) |

(52) U.S. Cl.
CPC ........... *H04L 43/0888* (2013.01); *H04B 3/54* (2013.01); *H04L 12/189* (2013.01); *H04W 72/12* (2013.01); *H04W 84/18* (2013.01)

(58) Field of Classification Search
CPC ..... H04L 43/0888; H04L 12/189; H04B 3/54; H04W 72/12; H04W 84/18
USPC ........................................................ 370/252
See application file for complete search history.

(56) References Cited

U.S. PATENT DOCUMENTS

| 7,345,998 | B2 | 3/2008 | Cregg et al. |
| 9,590,896 | B2 | 3/2017 | Hui et al. |
| 9,634,982 | B2 | 4/2017 | Hui et al. |
| 9,876,747 | B2 | 1/2018 | Hui et al. |
| 9,929,900 | B2 | 3/2018 | Licardie et al. |
| 9,999,087 | B2 | 6/2018 | Kish et al. |
| 2009/0010164 | A1* | 1/2009 | Wang ................ H04W 72/0486 370/235 |
| 2010/0238835 | A1* | 9/2010 | Lundgren ............... H04L 47/70 370/253 |

(Continued)

OTHER PUBLICATIONS

De Greve, et al., "Towards Ethernet-Based Wireless Mesh Networks for Fast Moving Users", Proceedings of the 32nd EUROMICRO Conference on Software Engineering and Advanced Applications (EUROMICRO-SEAA '06), Aug.-Sep. 2006, 9 pages, IEEE, Cavtat, Dubrovnik, Croatia.

(Continued)

*Primary Examiner* — Kwang B Yao
*Assistant Examiner* — Xuan Lu
(74) *Attorney, Agent, or Firm* — Behmke Innovation Group LLC; James J. Wong; James M. Behmke

(57) ABSTRACT

In one embodiment, a technique comprises monitoring data transfer over a radio frequency (RF) link between a first device and a second device in a mesh network where the second device is a descendent node and the first device is a parent node. The technique further transfers the data over a power link communication (PLC) when the RF link is inactive. The method also includes broadcasting, by the second device, RF link availability to at least a third device in the mesh network when the RF link with the first device is inactive where the third device has an active link with the second device and the third device is a descendent node of the second device. The method then includes communicating, between the second device and the third device, through the active RF link.

16 Claims, 10 Drawing Sheets

(56) References Cited

U.S. PATENT DOCUMENTS

| | | | |
|---|---|---|---|
| 2013/0022084 A1* | 1/2013 | Vasseur | H04B 1/713 375/134 |
| 2014/0036702 A1* | 2/2014 | Van Wyk | H04L 43/0823 370/252 |
| 2015/0071295 A1* | 3/2015 | Hui | H04L 45/48 370/400 |
| 2015/0333997 A1* | 11/2015 | Mermoud | H04L 43/12 370/252 |
| 2016/0330713 A1* | 11/2016 | Vijayasankar | H04W 72/005 |
| 2017/0085415 A1* | 3/2017 | Ameixiera | H04W 40/244 |
| 2017/0237669 A1* | 8/2017 | Hui | H04L 45/48 370/230.1 |
| 2018/0041247 A1* | 2/2018 | Zakaria | H04W 84/18 |

OTHER PUBLICATIONS

Gharavi, et al., "Analysis of Traffic Scheduling Technique for Smart Grid Mesh Networks", 2011, 9 pages, National Institute of Standards and Technology, Gaithersburg, MD, www.semanticscholar.org.

Sum, et al., "Performance Analysis of a Multi-PHY Coexistence Mechanism for IEEE 802.15.4g FSK Network", 2013 IEEE Wireless Communications and Networking Conference (WCNC), Apr. 2013, pp. 41-46, Shanghai, China.

Saputro, et al., "Privacy-Aware Communication Protocol for Hybrid IEEE 802.11s/LTE Smart Grid Architectures", 2015 IEEE 40th Local Computer Networks Conference Workshops (LCN Workshops), Oct. 2015, pp. 905-911, IEEE, Clearwater Beach, Florida.

\* cited by examiner

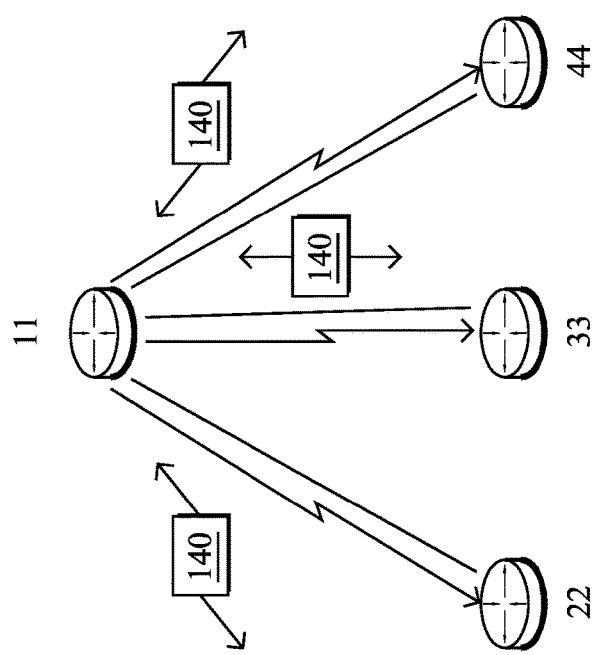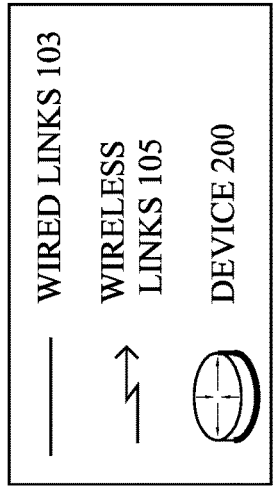
FIG. 1

INCREASING THROUGHPUT FOR MULTI-PHY NETWORKS

TECHNICAL FIELD

The present disclosure relates generally to computer networks, and, more particularly, to the increasing of data throughput in multi-PHY (e.g., connected grid) networks.

BACKGROUND

Many network communication protocols have been defined over the years based on particular situations, such as for large-scale networks, wireless networks, low-power and lossy networks (LLNs), and, in particular, industrial automation. LLNs such as those utilized in Internet of Things (IoT) mesh network deployments face a number of communication challenges. Unfortunately, such networks oftentimes communicate over a medium (e.g., wireless) that is strongly affected by environmental conditions that change over time. Some examples include temporal changes in interference (e.g. other wireless networks or electrical appliances), physical obstruction (e.g. doors opening/closing or seasonal changes in foliage density of trees), and propagation characteristics of the physical media (e.g. temperature or humidity changes). The time scales of such temporal changes can range between milliseconds (e.g. transmissions from other transceivers) to months (e.g. seasonal changes of outdoor environment).

Therefore, when mesh network nodes experience wireless transmission problems, data throughput drops and typical ways of wireless connection recovery provide less than optimal data throughput.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 1 illustrates an example schematic block diagram of a simplified computer network in one embodiment of the present disclosure;

DESCRIPTION OF EXAMPLE EMBODIMENTS

Overview

Figure 2:
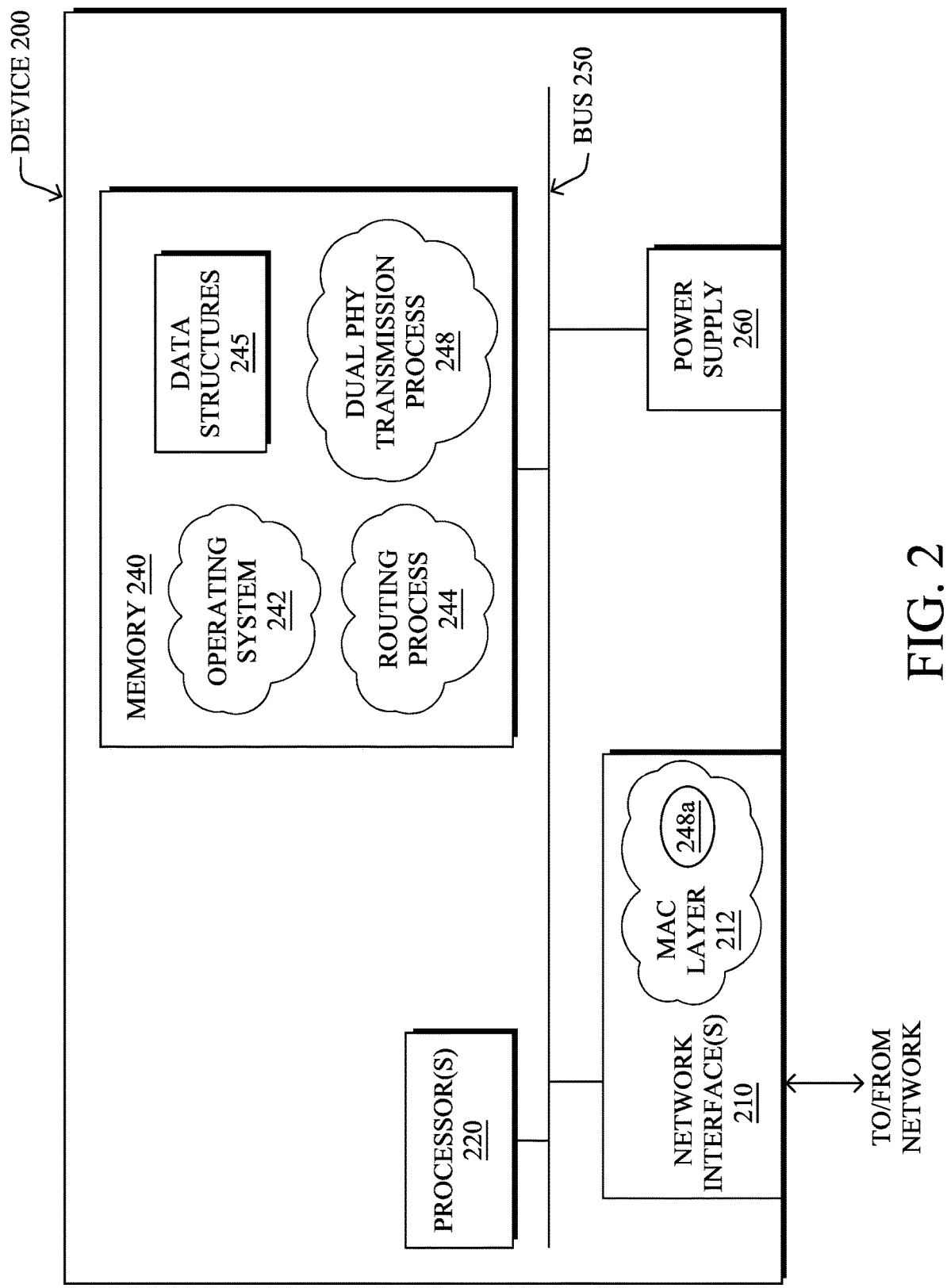
FIG. 2 illustrates an example schematic block diagram of an example device in one embodiment of the present disclosure.

According to one or more embodiments of the disclosure, a technique is disclosed which includes monitoring data transfer over a radio frequency (RF) link between a first device and a second device in a mesh network where the second device is a descendent node and the first device is a parent node. The technique further transfers the data over a power link communication (PLC) when the RF link is inactive. The method also includes broadcasting, by the second device, RF link availability to at least a third device in the mesh network when the RF link with the first device is inactive where the third device has an active link with the second device and the third device is a descendent node of the second device. The method then includes communicating, between the second device and the third device, through the active RF link.

According to one or more additional embodiments of the disclosure, the techniques herein may also include transmitting, by the first device, the data over a PLC link when the first RF link is inactive, causing the second device to broadcast second RF link availability to at least a third device in the mesh network when the first RF link with the first device is inactive, the third device having an active second RF link with the second device and the third device being a descendant node of the second device, and also causing the second device and at least third device to communicate through the active second RF link. The first device also reduces the amount of attempted communications over the first RF link to determine whether the first RF link has reactivated (e.g., by transferring the data over the PLC link using a ratio of probe messages between transmitting the data over the PLC link and attempting to transmit the data over the first RF link to detect RF link recovery), and reverts data transfer to the second device back to the first RF link when the first RF link is reactivated.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. A wireless network, in particular, is a type of shared media network where a plurality of nodes communicate over a wireless medium, such as, for example, using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid"

and "Smart Cities" (e.g., for Advanced Metering Infrastructure or "AMI" applications) and may often consist of wireless nodes in communication within a field area network (FAN). LLNs are generally considered a class of network in which both the routers and their interconnects are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example (and vastly simplified) computer network 100 (e.g., wireless and/or wired) illustratively comprising nodes/devices 200 (e.g., labeled as shown, "11," "22," "33," and "44") interconnected by communication links 103 and 105, as described below. In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless or wired network, and that the view shown herein is for simplicity (particularly, that while routers are shown, any wireless communication devices 11-44 may be utilized). Also, while the embodiments are illustratively shown herein with reference to a generally wireless network, the description herein is not so limited, and may be applied to networks that have wired links, wireless links, PLC links, etc.

Data transmissions 140 (e.g., traffic, packets, messages, etc. sent between the devices/nodes) may be exchanged among the nodes/devices of the computer network 100 using predefined network communication protocols such as certain known wireless protocols (e.g., IEEE Std. 802.15.4, WiFi, Bluetooth®, RF, etc.) or other shared media protocols where appropriate (e.g., PLC). As described herein, the communication may, in one embodiment, be based on dual PHY links such as, for example, links 103 and 105 (e.g., RF links and PLC links). As used herein, PHY refers to the physical layer of the OSI model. In this context, a protocol consists of a set of rules defining how the nodes interact with each other.

FIG. 2 is a schematic block diagram of an example device 200 (e.g., an apparatus) in accordance with one embodiment of the present disclosure. The device 200 may be a node used with one or more embodiments described herein, e.g., as nodes 11-44. The device 200 may comprise one or more network interfaces 210 (e.g., wireless, PLC, etc.), at least one processor 220, and a memory 240 interconnected by a system bus 250, as well as a power supply 260 (e.g., plug-in, battery, etc.).

The network interface(s) 210, e.g., transceivers, contain the mechanical, electrical, and signaling circuitry for communicating data over wireless links and/or wired links coupled to the network 100. The network interface 210 may be configured to transmit and/or receive data using a variety of different communication protocols. The network interface may also be configured to support dual PHY based communication as described herein. In addition, the interface 210 may comprise an illustrative media access control (MAC) layer module 212 (and other layers, such as the physical or "PHY" layer, as will be understood by those skilled in the art). Note, further, that the nodes may have two or more different types of network interfaces 210, namely, wireless and/or wired/physical connections, and that the example FIG. 2 herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and a dual PHY communication process 248. Note that while the dual PHY communication process 248 is shown in centralized memory 240, alternative embodiments provide for the dual PHY communication process 248 to be specifically operated within the network interfaces 210, such as a component of MAC layer 212 (process "248a"). In one embodiment, there may be separate networks interfaces and accompanying MAC layers for separate PHY communication links.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (e.g., a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), Dynamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

The device 200 as described herein may be part of the LLN discussed previously. An example implementation of LLNs is an "Internet of Things" network. As described above, the term "Internet of Things" or "IoT" may be used by those in the art to refer to uniquely identifiable objects or "things" and their virtual representations in a network-based architecture. In particular, the term "IoT" generally refers to the interconnection of objects (for example, smart objects), such as sensors and actuators, over a computer network (for example, IP), which may be the Public Internet or a private network. Such devices have been used in the industry for decades, usually in the form of non-IP or proprietary protocols that are connected to IP networks by way of protocol translation gateways. With the emergence of a myriad of applications (for example, smart grid, smart cities, building and industrial automation, etc.), it has been of the utmost importance to extend the IP protocol suite for these networks.

Smart object networks, such as sensor networks, in particular, are a specific type of LLN having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver (such as, for example, RF transceiver) or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

As noted above, shared-media communication networks, such as wireless and power-line communication (PLC) networks (a type of communication over power-lines), provide an enabling technology for networking communication and can be used for example in AMI networks, and are also useful within homes and buildings. Wireless links such as, for example, RF links are a more desirable transmission mechanism due to their higher throughput capabilities in comparison to other data transmission links like, in one embodiment, PLC links. Therefore, though each device in a given PLC network may be connected to the same physical power-line, due to their noisy environment, a PLC link provides limited range and connectivity is highly unpredictable, making PLC a low throughput link and undesirable to be the main communication link between devices.

LLNs can be utilized in many different networking applications such as, in one embodiment, AMI networks which demand that many different applications operate over the network. For example, the following are example applications that may operate simultaneously over AMI networks: 1) Automated Meter Reading that involves periodically retrieving meter readings from each individual meter to a head-end server; 2) Firmware upgrades, for example, that involve communicating relatively large firmware images (often 500 KB or more) from a head-end server to one device, multiple devices, or all devices in the network; 3) Retrieving load curves; 4) Real-time alarms generated by meters (for example, power outage events) that actually act as sensors; 5) Periodically retrieving network management information from each meter to a Network Management System; 6) Supporting demand response applications by sending multicast messages from a head-end device to large numbers of meters, etc. One of skill in the art will appreciate that the above-enumerated applications are examples and that other types of AMIs and LLNs may be benefit from the disclosure described herein.

Generally speaking, these different applications have significantly different traffic characteristics, for example, unicast vs. multicast, small units of data vs. large units of data, low-latency vs. latency-tolerant, flows toward a head-end vs. away from the head-end, etc. Furthermore, since these applications must operate simultaneously over a highly constrained LLN network, the network can easily experience congestion, especially when different applications are sending traffic simultaneously. For example, the bandwidth of LLN links may be as low as a few Kbits/s, and even lower when crossing transformers (for PLC).

As an example, many Smart Grid AMI products may support multiple link technologies simultaneously, such as RF and PLC. Throughput between RF and PLC is generally asymmetrical. The data rate of RF can be typically configured as 50 kbps, 150 kbps, 200 kbps, 400 kbps or above. However, the data rate of narrow band PLC varies from 10 kbps to 40 kbps depending on the modulation technique used such as, for example, ROBO, BPSK, QPSK or 8PSK.

Figure 3:
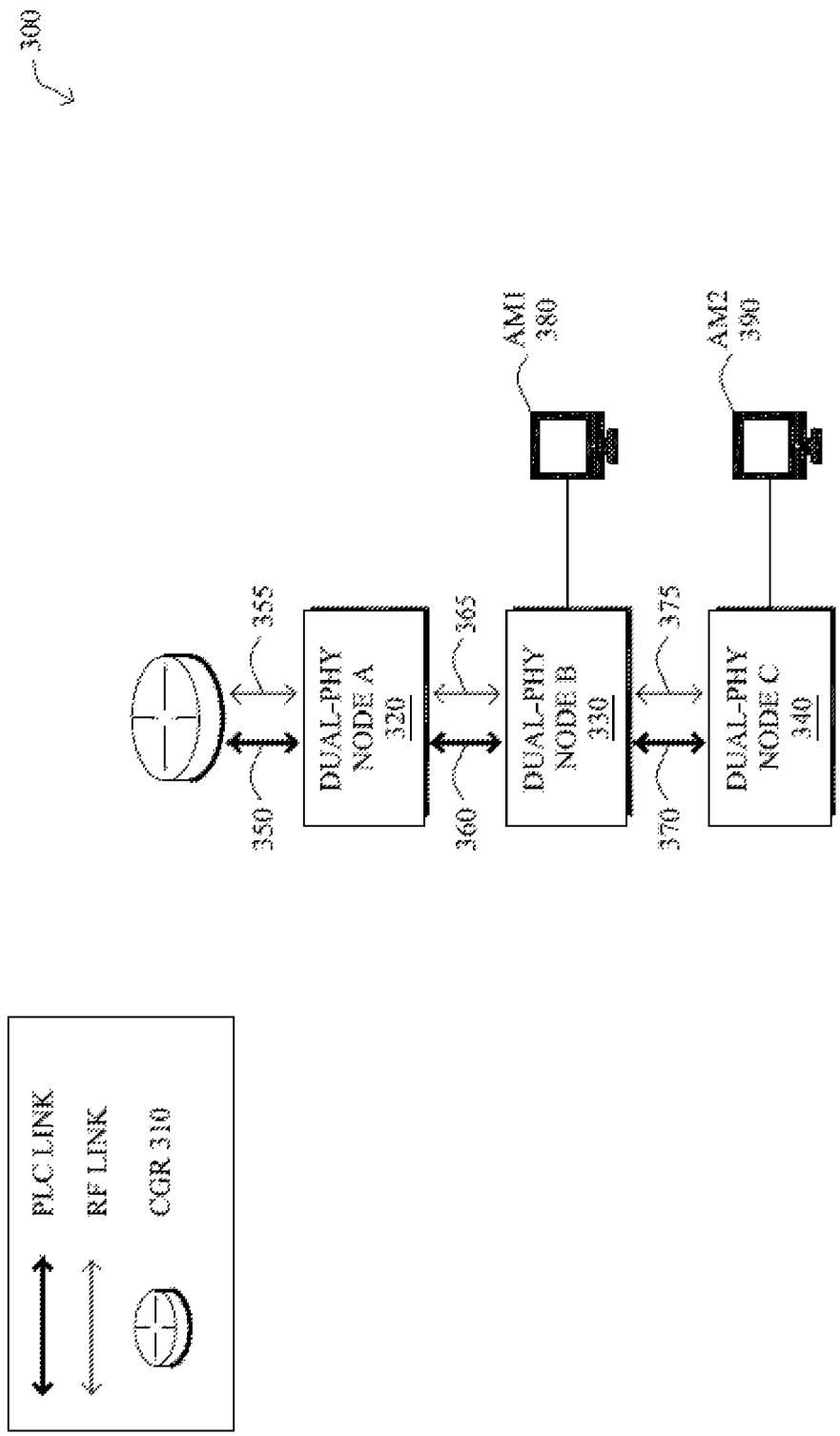
FIG. 3 illustrates an example mesh network in one embodiment of the present disclosure.

FIG. 3 shows a mesh network 300 in one embodiment of the present disclosure. The network 300 shows an example mesh network which may be utilized in a connected grid type environment with a plurality of devices including, for example, a connected grid router (CGR) 310 and multiple downstream (also known as descendent) dual PHY connected devices 320, 330, and 340. A dual PHY device, in an embodiment, is a node/device that is capable of communicating using multiple different communication links. In one embodiment, the dual PHY links may be RF and PLC communication links. It should be understood that the connected devices 320, 330, and 340 may be any suitable type of objects or nodes, such as for example, smart objects, or "things" as may be contemplated by the Internet of Things concept. In one embodiment, the devices 320, 330, and 340 may configured in a manner suitably similar to the device 200 as described in FIG. 2. In this example embodiment, advanced metering infrastructures 380 and 390 are connected to the devices 330 and 340 respectively. In various embodiments, the network 300 may include one or more mesh networks, such as, for example, Internet of Things networks.

In one embodiment of the network 300, radio frequency (RF) links 355, 365, and 375 may be first used to communicate between devices 310, 320, 330, and 340 in the network 300 and when an RF link is inactive, power line communication (PLC) links 350, 360, and 370 may be utilized as appropriate. In this embodiment of the network 300, multiple link technologies may be supported such as, for example, RF and PLC. In a particular embodiment, Smart Grid AMI products such as those made by Cisco Systems, Inc. may be configured to implement the present disclosure where each device or node on the mesh network is capable of communicating using RF and PLC. As known to those skilled in the art, throughput between RF links and between PLC are asymmetrical. Typically, the data rate of RF can be configured as 50 kbps, 150 kbps, 200 kbps, and 400 kbps or above. However, the date rate of narrow band PLC can vary from 10 kbps to 40 kbps depending on the different modulation of ROBO, BPSK, QPSK and 8PSK. Therefore, unless there is an RF link failure or inactivity, a dual PHY node chooses RF as the preferred uplink, and PLC as an alternative up link to optimize network throughput. It should be appreciated that the network 300 shows an optimally performing network state where the RF links 355, 365, and 375 are all active while later figures show network states where certain node to node RF links are inactive and therefore PLC links are utilized.

Figure 4:
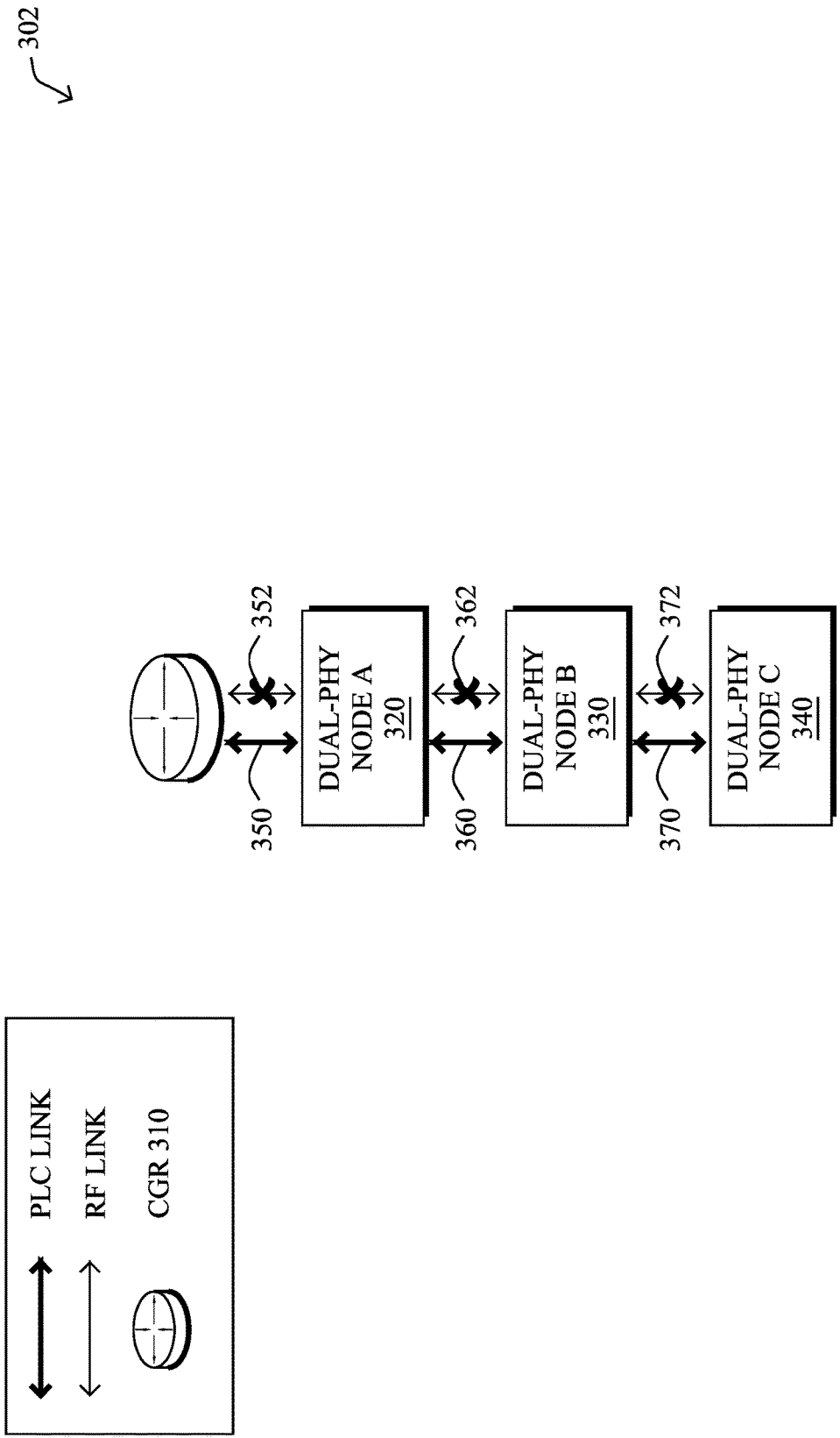
FIG. 4 illustrates an example network which displays a network without an active RF link in accordance with one embodiment of the present disclosure.

FIG. 4 illustrates a network 302 which displays a network without an active RF link in accordance with one embodiment of the present disclosure. The network 302 is similar in structure to the network 300 as described in reference to FIG. 3 except the RF links are inactive as shown by inactivated RF links 352, 362, and 372. In one embodiment, a mesh network constructed with multi-PHY nodes is configured such that a node always transmits using an RF link first. After a transmission over the RF link has failed a certain number of times, the node will start transmitting using a PLC link which is the condition shown in the network 302. In one embodiment, the number of RF link transmission failures before PLC link utilization is four times, but it should be understood by those skilled in the art that a device may be configured to change communications to a PLC link after any suitable number of RF transmission failures. Unfortunately, the first RF then PLC transmission mechanism often times lead to high latency and low throughput, especially in bad wireless environments. Such environments may occur in conditions as described above (e.g., temporal changes in interference, physical obstruction, and propagation characteristics of the physical media, etc.).

As shown in the network 302 when an RF link fails, the CGR 310 does not have the active RF link with device 320 so the PLC link 350 is utilized even though such a link has lower throughput than when an active RF link. In one embodiment, because there is no active RF link, an RF broadcast schedule from the CGR 310 cannot propagate via the PLC link 350. Therefore, in that case, the descendants of the device 320 (e.g., devices 330 and 340) cannot communicate with each other via an RF link as shown by the inactive RF links 362 and 372 even if the RF link between those devices would be available otherwise.

In an embodiment, when an RF link is no longer active, retransmission times to reactivate the RF link are reduced. Usually when an RF link goes down, the system intermittently retransmits via the RF to determine if the RF link can be reactivated. By reducing the transmission times, less overhead may be utilized to determine if the RF link can be reactivated. Therefore, throughput under this circumstance can be maximized by balancing PLC link transmission with attempts to reactivate the RF link.

In one embodiment, the CGR 310 will first tag an inactive RF link's state as being deactivated and will accordingly reduce transmission times. The endpoint will then adopt the example transmission parameters on the RF link as shown in Table 1 below which can reduce the RF's retransmissions extra cost.

TABLE 1

| State | Transmission parameter (Attempt times) | Transmission parameter (back-off timing) | Optimization Mechanisms |
|---|---|---|---|
| Deactivated | 1 successful transmission attempt to activate link | 5 milliseconds | Ratio transmission |

TABLE 1-continued

| State | Transmission parameter (Attempt times) | Transmission parameter (back-off timing) | Optimization Mechanisms |
|---|---|---|---|
| Active | 4 failed transmission attempts to deactivate link | [5*2^n, 500] milliseconds | Sliding window transmission |

According to embodiments shown in Table 1, when an RF link is in a deactivated state, the number of times an attempt is made at RF transmission is reduced as compared to when the RF link is active. Also, in one example embodiment of a deactivated state as shown in Table 1, in addition to reducing the number of transmission attempts, the back-off timing may be set to a certain minimum time (e.g., a length of time to wait before attempting a retransmission). In one embodiment, the minimum back-off time is set to about 5 milliseconds. It should be understood that any suitable back-off time can be utilized which can reduce the overhead of retransmitting messages over RF. In contrast, when the RF link is active, a maximum back-off time may be utilized. In one embodiment, the maximum back-off time may set to a period of time which would be configured to generate a high probability of an RF link being available for data transmission. In one embodiment as indicated in Table 1, the back-off timing when the RF link is active may be in a range between about $5*2\hat{}n$ and 500 milliseconds where n is the number of failed transmissions.

Also, as indicated in Table 1, when the RF link is deactivated, a ratio transmission mechanism may be utilized to optimally increase PLC data transmission while at the same time retransmitting via RF to determine if the RF link can be reactivated. The ratio transmission mechanism includes using a ratio of probe messages to detect RF link recovery. A probe ratio is the count of sending a PLC unicast message divided by the count of sending an RF unicast message. Therefore, when more PLC messages are sent as opposed RF messages, the ratio becomes greater. This probe ratio can be set to balance the throughput and recovery speed of the network. The higher the probe ratio, the higher the throughput will be via PLC and the lower the ratio the lower the throughput will be via PLC. Conversely the lower the probe ratio, the higher the RF recovery rate will be and the higher the probe ratio the lower the RF recovery rate will be. In addition to balancing the probe ratio, in order to reduce the cost of sending RF messages, the back-off window may be reset from a higher back-off timing to a lower minimum back-off timing. In one embodiment, the back-off window may be reset from the maximum back-off window to the minimum back-off window. It should be understood that back-off timing refers to the amount of time after RF transmission failure that an RF transmission is again attempted.

Equation 1 shows one embodiment of data throughput of a PLC link when an RF link is inactive. In this embodiment, throughput is shown without the use of a probe ratio mechanism thereby resulting in lower than optimal data throughput.

$$\text{Throughput}_{pre}=200*8/(((T_{rf}+T_{ack}+T_{maxBack})*\text{attempt\_times}+T_{plc})/1000) \quad \text{Equation 1}$$

In a specific example, a message with an IP payload of 200 bytes is sent. In this example, the RF transmission timing $T_{rf}$ is 40 milliseconds, the PLC transmission timing $T_{plc}$ is 135 milliseconds, and the RF's ACK timeout is $T_{ack}$ is 32 milliseconds. Therefore, in such an example, by using the RF first then PLC mechanism the throughput is only 6.6 kbps when the RF link is inactive. In contrast, by using the ratio probe transmission mechanism as discussed in this disclosure, the throughput can be improved 75 kbps or better. This is shown, in one embodiment, by Equation 2 below which quantifies data throughput by using the ratio probe transmission:

$$\text{Throughput}_{ratio}=200*8*\text{ratio}/(((T_{rf}+T_{ack}+T_{minBack})*\text{attempt\_times}+T_{plc}*\text{ratio})/1000)$$ Equation 2

In Table 1, when the RF link is reactivated, certain transmission parameters may be utilized in accordance with the present disclosure. In such an embodiment, the RF attempt time is set to a higher number than when the RF link is inactive where in one specific embodiment, the number may be set to 4. Therefore, after the RF link has been activated, more failed attempt times have to occur for the RF link to be labeled as inactive. Conversely in the embodiment as shown in Table 1, when the RF link is already inactive, then fewer failed attempts are required before the RF link is labeled as inactive. Also, in an embodiment, the back-off timing can be set to a higher back-off timing where in a specific embodiment, the back-off timing can be set to the range as shown in Table 1. Further, when the RF link is activated, a sliding window mechanism may be utilized which can be used to smoothly revert back to the RF link from the PLC link without jitter. It should be understood that other suitable mechanisms may be used to adjust the data send window to optimize data throughput.

In one embodiment, a node may transmit using the RF link by applying the sliding window mechanism. In a particular embodiment, the sliding window can be configured to use the sequence set of $[2^n, 2^{n+1}, 2^{n+2} \ldots, 2^{n+m}]$. If the transmission fails with attempt times, the node will increase one step ($2^m$) in the sliding window set until the max step ($2^{n+m}$) Once the transmission succeeds on the RF link, the node will reset as the minimum step ($2^n$) of the sliding window set. It should be understood that the parameters n and m may be adjusted to balance the expected throughput, network scale (minimum packet counts in minutes for maintaining network) and recovery timing RF link.

Figure 5:
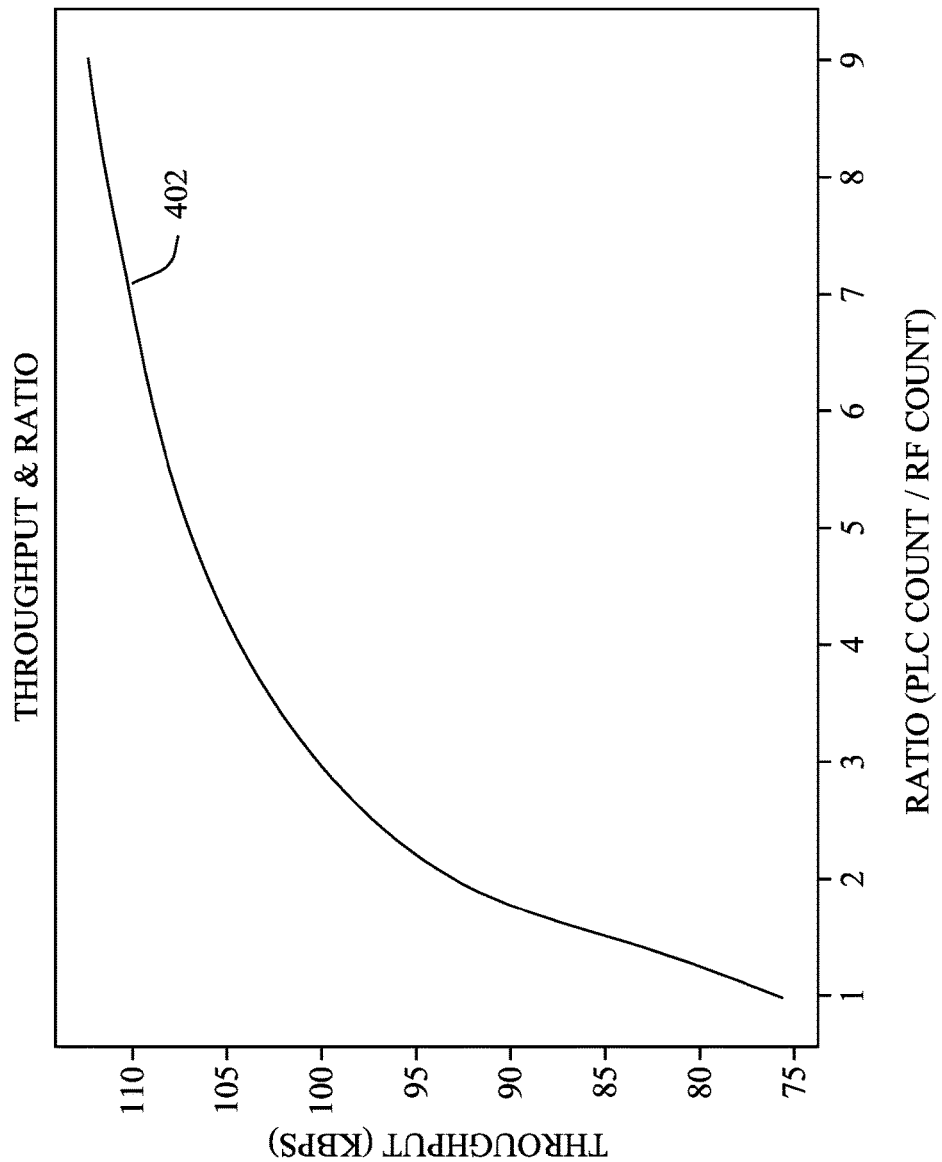
FIG. 5 illustrates an example graphical relationship between data throughput and PLC count/RF count in one embodiment of the present disclosure.

FIG. 5 shows a graph 400 which illustrates the graphical relationship between data throughput and PLC count/RF count in one embodiment of the present disclosure. Graph 400 includes on the X-axis the ratio of the PLC count to RF count and on the Y-axis data throughput in kbps. Curve 402 depicts the data throughput generated for a particular PLC count/RF count ratio. As can be seen in graph 400, as the ratio increases (i.e., PLC transmission increases and/or RF transmission decreases), data throughput via an inactive RF link increases. This occurs because in an inactive RF link, the RF transmission attempts fail and contributes little or nothing to the data throughput while data transmission over an active PLC link contributes to increase data throughput.

Figure 6:
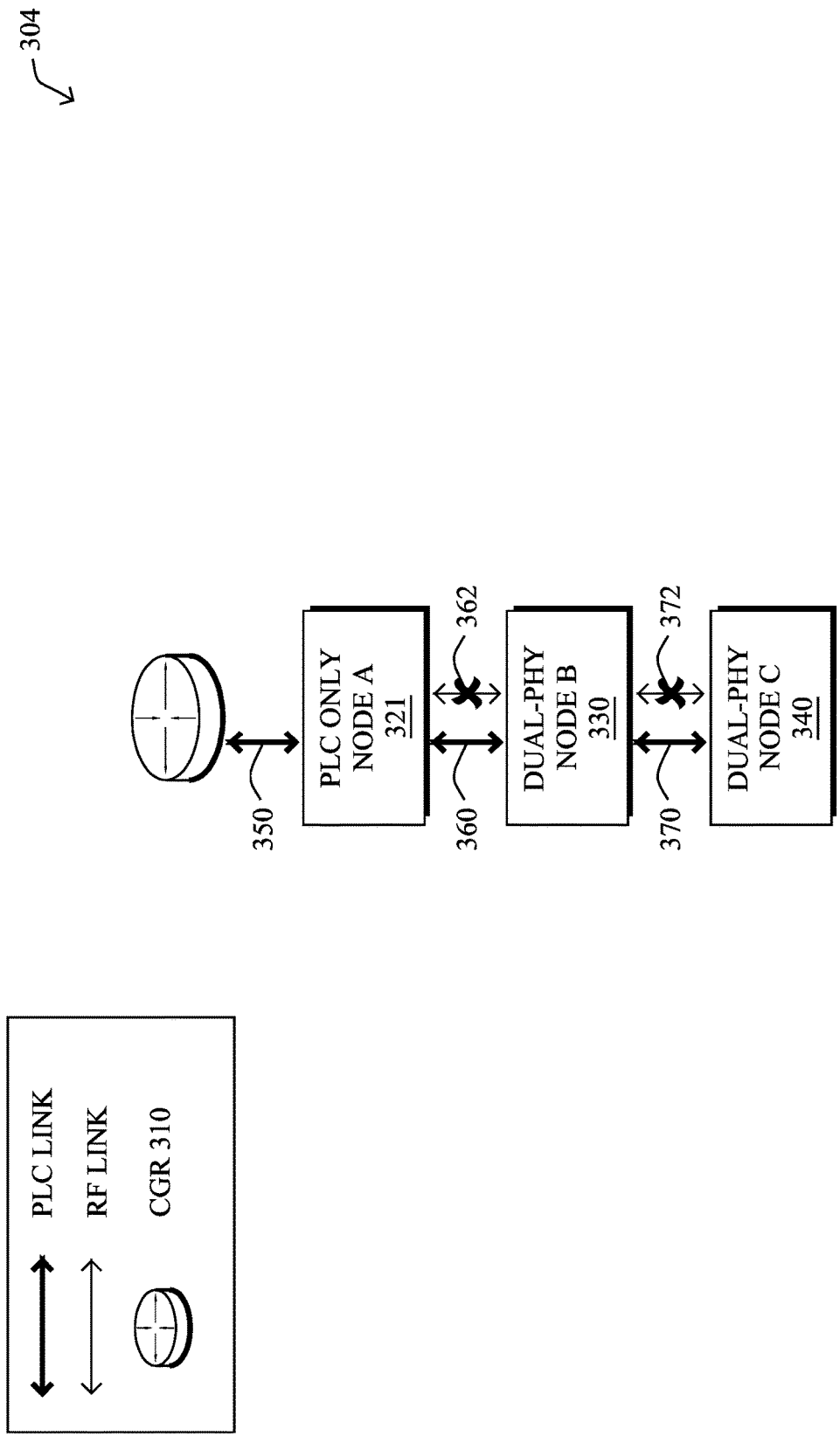
FIG. 6 illustrates an example network which includes a PLC only device in accordance with one embodiment of the present disclosure.

FIG. 6 shows a network 304 which includes a PLC only device 321 in accordance with one embodiment of the present disclosure. The PLC only device 321 in an embodiment, may be the first descendent node of the CGR 310. Therefore, the PLC only device 321 will not receive an RF broadcast schedule from the CGR 310. Consequently, the RF broadcast schedule cannot be passed along to the devices 330 and 340 which are dual PHY nodes capable of communicating via RF. Without the RF broadcast schedule, the dual PHY nodes defined by the devices 330 and 340 do not know the RF broadcast schedule and therefore will not communicate over RF with each other even though they are capable of doing so. It should be understood by those skilled in the art that the broadcast schedules are messages from a node to other multiple nodes in a network notifying those multiple nodes of the message sending schedules associated with each node in a network.

Figure 7:
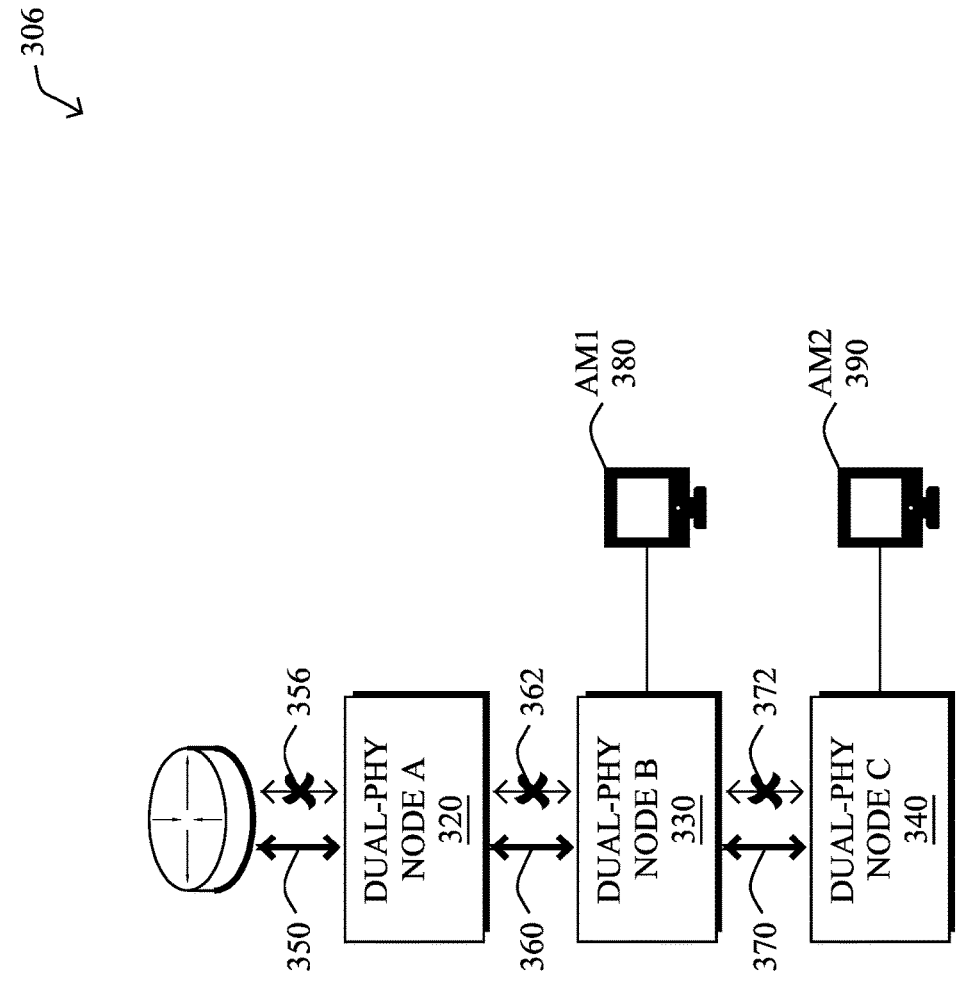
FIG. 7 illustrates an example Smart Grid network in accordance with one embodiment of the present disclosure.

FIG. 7 shows a Smart Grid network 306 in accordance with one embodiment of the present disclosure. The structure of the network 306 is similar to the network 300 described above in reference to FIG. 3 except the RF links 352, 362, and 372 are inactive and the network 306 is shown to be connected with AMIs 380 and 390. In this example network state, the device 320 (e.g., hop 1 node A) loses the RF link 362 with the CGR 310. Therefore, since the RF broadcast schedule cannot be broadcasted to the device 330 (e.g., node B), the device 330 will also lose the RF link with the device 320 so consequently the RF link 372 also becomes inactive. Also, since the device 330 does not receive the RF broadcast schedule, the device 340 (e.g., node C) also does not receive the RF broadcast schedule and is therefore unable to communicate via an RF link with the device 320.

For this particular example, the application module (AM1) 380 is connected to the device 330 (e.g., node B) and the application module (AM2) 390 is connected to the device 340 (e.g. node C). In this case, again although the device 330 and the device 340 may have RF resources and are therefore capable of communicating with the AM1 380 and the AM2 390 respectively through RF links, only PLC links can be active due to the devices 330 and 340 not be able to receive an RF broadcast schedule the CGR 310.

Figure 8:
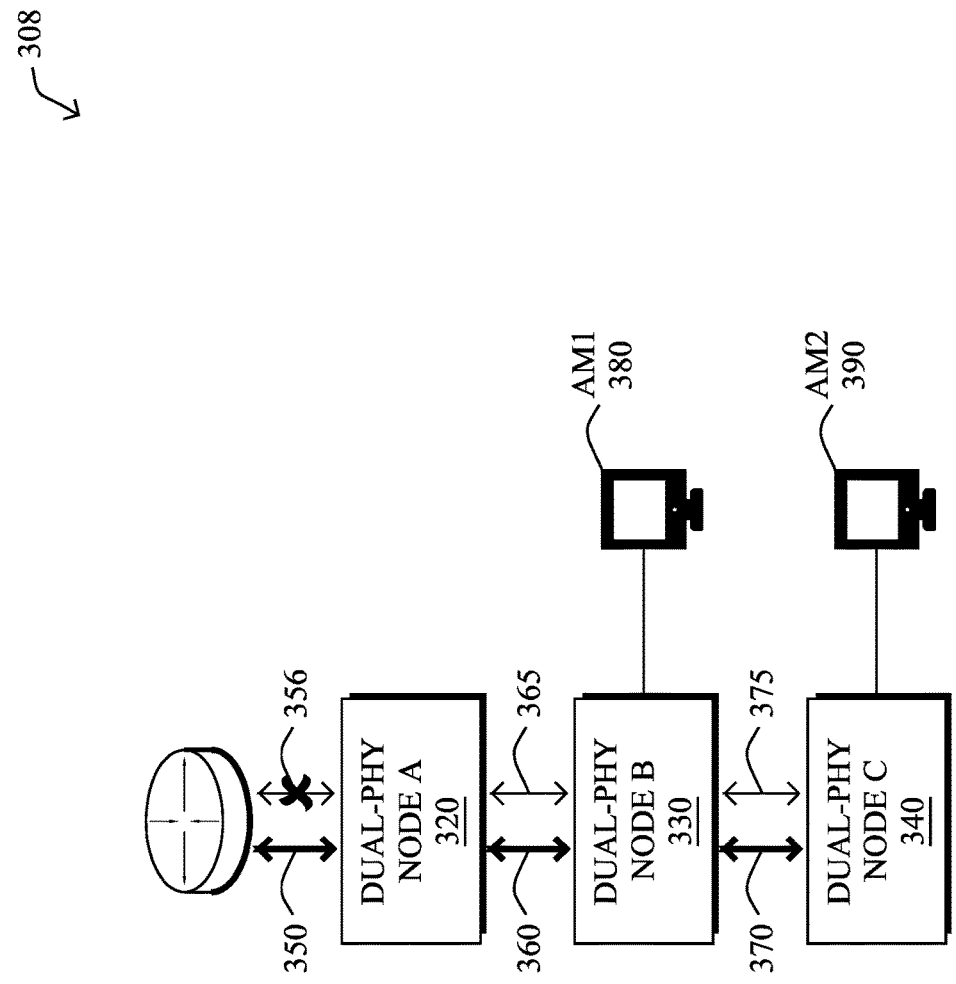
FIG. 8 illustrates an example network with an inactive RF link between the CGR and the first descendent node in accordance with one embodiment of the present disclosure.

FIG. 8 illustrates a network 308 with an inactive RF link between the CGR 310 and the first descendent node in accordance with one embodiment of the present disclosure. As discussed above, in a multi PHY network, in one embodiment, a multi PHY node may choose RF as the main data throughput link and then use PLC as an alternative link in order to optimize data throughput in the network 308. In an embodiment of the network 308, the active RF resources between the device 320 and its descendants are wasted since the RF link 356 between the device 320 and the CGR 310 (e.g., parent node) is inactive. Therefore, because the device 320 cannot receive the RF broadcast schedule from the CGR 310, the device 320 can only communicate with the devices 330 and 340 through the PLC links 360 and 370 respectively even though the RF links 365 and 375 are active. Therefore, in an embodiment, data throughput in the network 308 may be limited by the inability to use any active RF links downstream from the CGR 310 when the initial inactive RF link limits the propagation of the RF broadcast schedule. To put it differently, in an example, data throughput in the network 308 may be limited to PLC links when and upstream RF link is inactive even when downstream RF links are active.

Therefore, to enhance data throughput in the network 308, in one embodiment, when the dual PHY device 320 detects that its RF link with the parent node (which in this example is CGR 310) is inactive, the dual PHY device 320 may generate the broadcast schedule itself and propagate the broadcast schedule to its descendants such as, for example, devices 330 and 340. The descendants may be then be configured to use the active RF link to join the network 308, and the bandwidth between the devices 320, 330, and 340 is increased from a single PLC to both PLC and RF. When the device 320 detects that its RF link with the CGR 310 is recovered, then the device 320 can receive the broadcast schedule from the CGR 310 and the new broadcast schedule can then be propagated to its descendants which recovers the network seamlessly.

Figure 9:
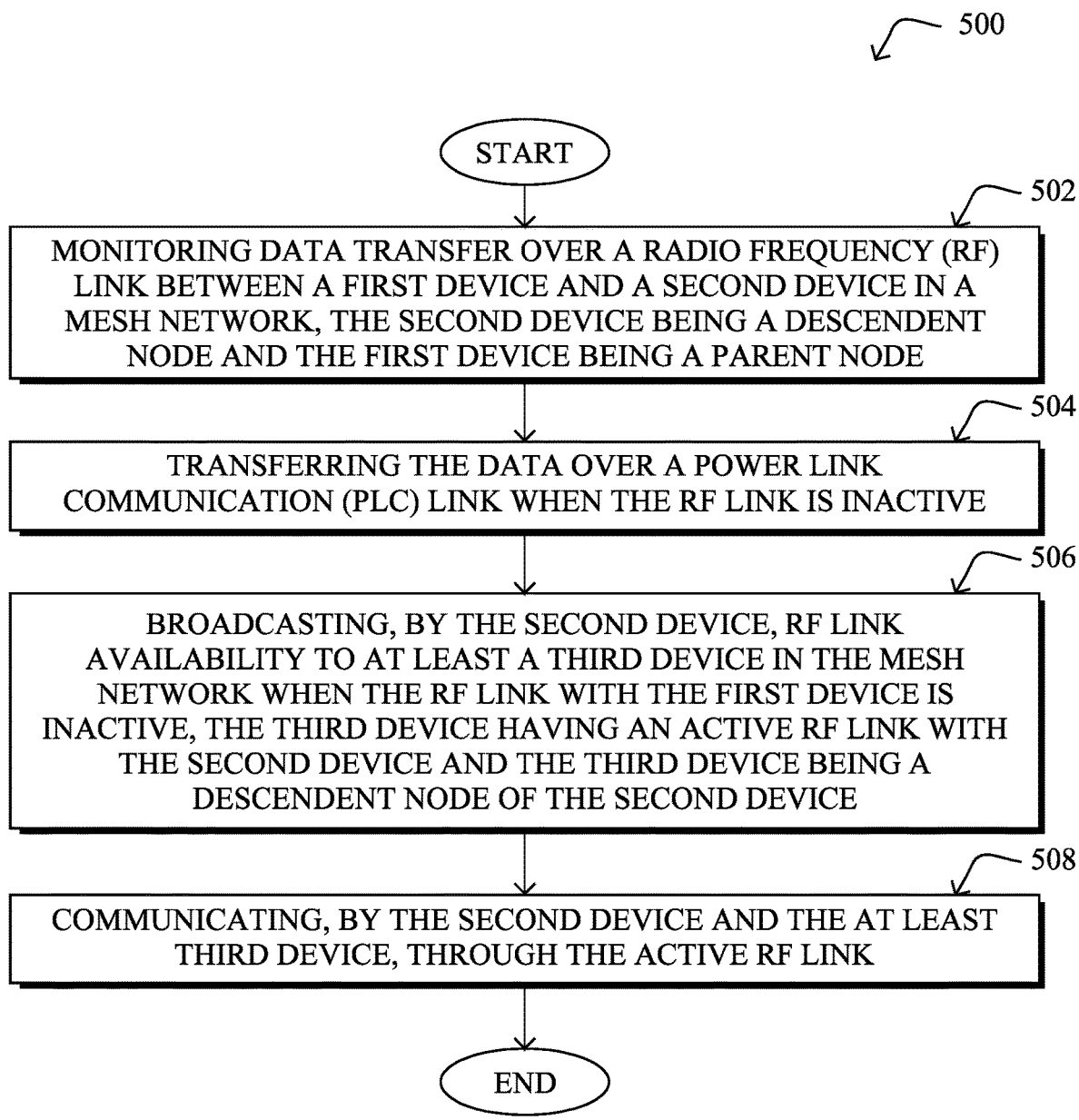
FIGS. 9 and 10 illustrates example procedures for optimizing data transfer in a dual PHY mesh network.
Figure 10:
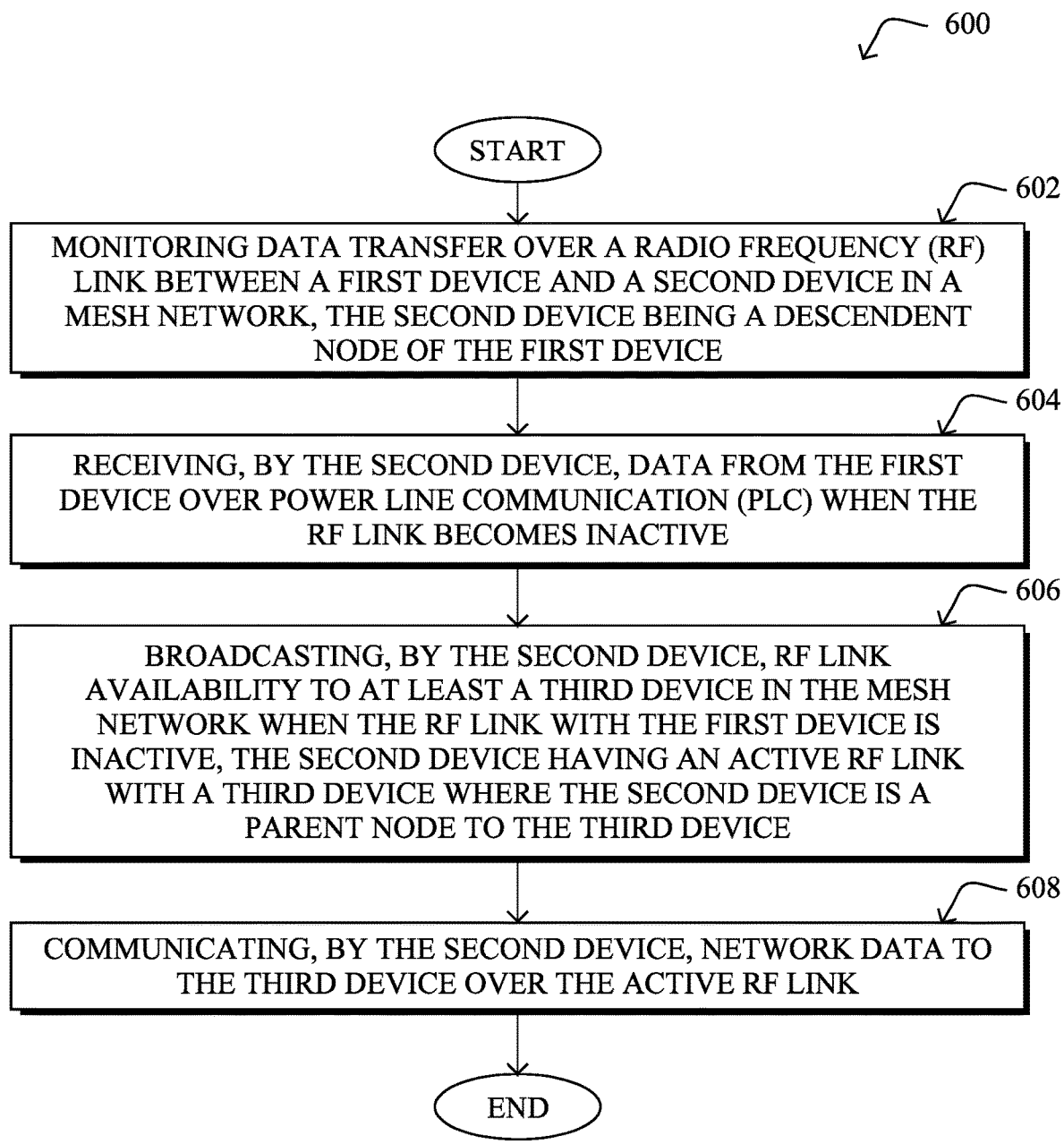

FIGS. 9 and 10 show flowcharts 500 and 600 illustrating example embodiments for optimizing data transfer in a dual PHY mesh network. For example, a non-generic, specifically configured device (e.g., device 200) may perform procedures 500 and 600 by executing stored instructions (e.g., process 248). The procedure 500 may start at operation 502, and continue to operation 508 and procedure 600 may start at operation 602 and continue to operation 608, where, as described in greater detail above data throughput may be optimized to intelligent managing of dual PHY link transmission capabilities.

It should be noted that while certain operations within flowcharts 500 and 600 may be optional as described above, the operations shown in FIGS. 9 and 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while operations 502-508 and 602-608 are described separately, certain steps from each operation may be incorporated into each other operation, and the operations are not meant to be mutually exclusive.

The flowchart 500 begins with operation 502 which monitors data transfer over a radio frequency (RF) link between a first device and a second device in a mesh network where the second device is a descendent node and the first device is a parent node. It should be understood that operation 502 may be conducted by any of the nodes involved in the data throughput operation. In one embodiment, the parent node monitors the data throughput and when it senses that the data transmission of the RF link has failed, the parent node will move to operation 504. In one embodiment, when the transmission has failed 4 times, the parent will label the RF link as being inactive. In yet another embodiment, a descendent node may determine that the RF link is inactive when a certain amount of time passes, it starts to receive more data over the PLC link, and/or it is notified by the parent node that the RF link is inactive.

Then operation 504 transfers the data over a power link communication (PLC) when the RF link is inactive. As discussed above, the PLC link generally has lower throughput. Therefore, in one embodiment, the parent node will lower the number of attempts to transmit over the RF link but will not entirely cease to transmit over the RF link. It should be understood that as discussed herein transfer can refer to transmitting or receiving the data. As discussed in reference to the figures above, mechanisms can be used to lower the overhead of trying to reactivate the RF link while increasing the PLC link data transfer. In this way the PLC data transmission may be optimized but the nodes keep open the possibility of reactivating the RF link. In one embodiment, a probe ratio as discussed in the above figures may be used detect RF link recovery. The probe ratio is the number of times a PLC unicast is sent divided by the count of sending the RF unicast. If the RF link is reactivated, the nodes will revert to using the RF link for the data transfer since that will increase data transmission. In an embodiment, when the RF link is determined to be active, a sliding window can be used to revert back to the RF link as described in FIG. 4.

After operation 504, the method moves to operation 506 which broadcasts, by the second device, RF link availability to at least a third device in the mesh network when the RF link with the first device is inactive where the third device has an active RF link with the second device. In such an embodiment, the third device is a descendent node of the second device. In an embodiment of operation 506, the second device/node may send a multicast message (or broadcast message where appropriately configured) to multiple descendent devices/nodes. In another embodiment, the second device/node may send unicast messages to specific descendent nodes. It should be understood that any suitable manner of notifying other nodes of active RF links may be utilized depending on network configuration and/or the application desired.

Then the method moves to operation 508 which communicates, between the second device and the third device, through the active RF link. In one embodiment, operation 508 activates and uses the RF links discovered by operation 506. In this way downstream RF links can be used instead of slower PLC links even when an upstream node such as, for example, the CGR 310 in the figures above, can only communicate via PLC to the nodes below.

It should be understood that the flowchart 600 described below illustrates the operations described in flowchart 500 above from, in one embodiment, the perspective of a node (e.g., dual-PHY device 320 described above) that is a descendent of a parent node (e.g., CGR 310 described above). Flowchart 600 begins with operation 602 which monitors data transfer over an RF link between a first device and a second device in a mesh network where the second device is a descendent node of the first device. In one embodiment, the first device may be a CGR although one skilled in the art would understand that the first device could be any parent node to the second device. In one example, the second device waits to receive a PLC message from the first device tagging the RF link as being inactive. After operation 602, the flowchart 600 moves to operation 604 which receives, by the second device, data from the first device over PLC when the RF link becomes inactive. Then operation 606 broadcasts, by the second device, RF link availability to at least a third device in the mesh network when the RF link with the first device is inactive. The second device, in an embodiment, has an active RF link with a third device where the second device is a parent node to the third device. After operation 606, the flowchart 600 proceeds to operation 608 which communicates, by the second device, data to the third device over the active RF link.

Therefore, by utilizing the methodology as described in the flowcharts 500 and 600, data throughput in, for example the networks described herein, may be optimized by intelligently moving data transfer from an inactive upstream RF link to an active PLC link, and when a downstream RF links are available being able to utilize those downstream RF links even when only the PLC link is available upstream.

While there have been shown and described illustrative embodiments that provide for optimizing data transmission in a mesh network, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
monitoring transfer of data over a first radio frequency (RF) link between a first device comprising a connected grid router (CGR) and a second device in a mesh network, by the second device, the second device being a descendent node of the first device;
receiving, by the second device, data from the first device over a power line communication (PLC) link when the first RF link is inactive;
generating, by the second device and in response to receiving data from the first device over the PLC link when the first RF link is inactive, an RF broadcast schedule that is different from one received from the first device;
broadcasting, by the second device and based on the RF broadcast schedule, second RF link availability to at least a third device in the mesh network when the first RF link with the first device is inactive by sending the RF broadcast schedule to at least the third device, the second device having an active second RF link with the third device where the second device is a parent node to the third device; and
communicating, by the second device and after the third devices receives the RF broadcast schedule generated by the second device, network data to the third device over the active second RF link, wherein the third device propagates the RF broadcast schedule to other child nodes.

2. The method as in claim 1, further comprising:
reverting back to data transfer over the first RF link when the first RF link between the first device and the second device is reactivated.

3. The method as in claim 2, wherein reverting back to the first RF link when the first RF link is reactivated includes receiving an RF broadcast schedule from the first device.

4. The method as in claim 1, wherein monitoring the transfer of data includes the second device receiving a message from the first device that the first RF link is inactive.

5. The method as in claim 1, wherein the RF broadcast schedule is a schedule of when messages will be sent over designated RF links.

6. The method as in claim 1, wherein the at least third device is capable of communicating with additional devices due to the RF broadcast schedule received from the second device.

7. The method as in claim 1, wherein the broadcasting includes sending RF link availability of the second device to multiple descendent nodes by using a multicast message when the first RF link with the first device is inactive.

8. An apparatus, comprising:
a processor;
a radio frequency (RF) transceiver configured to communicate in a mesh communication network;
a power line communication (PLC) transceiver configured to communicate in the mesh communication network; and
a memory configured to store a process executable by the processor, the process when executed by the processor operable to:
monitor transfer of data over an RF link between a first device comprising a connected grid router (CGR) and a second device in a mesh network, as the second device, the second device being a descendent node of the first device;
receive data from the first device over a PLC link when the RF link is inactive;
generate, in response to receiving data from the first device over the PLC link when the first RF link is inactive, an RF broadcast schedule that is different from one received from the first device;
broadcast, based on the RF broadcast schedule, RF link availability to at least a third device in the mesh network when the RF link with the first device is inactive by sending the RF broadcast schedule to at least the third device, the second device having an active RF link with the third device where the second device is a parent node to the third device; and
communicate, after the third devices receives the RF broadcast schedule generated by the second device, network data to the third device over the active RF link, wherein the third device propagates the RF broadcast schedule to other child nodes.

9. The apparatus as in claim 8, wherein the process when executed further comprises:
reverting back to data transfer back over the RF link when the RF link between the first device and the second device is reactivated.

10. The apparatus as in claim 8, wherein the process when executed for monitoring the transfer of data includes the second device receiving a message from the first device that the RF link is inactive.

11. The apparatus as in claim 8, wherein the RF broadcast schedule is a broadcast schedule of when messages will be sent over designated RF links.

12. The apparatus as in claim 8, wherein the at least third device is capable of communicating with additional devices due to the RF broadcast schedule received from the second device.

13. A method, comprising:
monitoring transfer of data over a first radio frequency (RF) link between a first device and a second device in a mesh network, by the first device comprising a connected grid router (CGR), the first device being a parent node of the second device;
transmitting, by the first device, the data over a power link communication (PLC) link when the first RF link is inactive, causing the second device to broadcast second RF link availability using an RF broadcast schedule generated by the second device to at least a third device in the mesh network when the first RF link with the first device is inactive, the RF broadcast schedule being different from one received from the first device, the third device having an active second RF link with the second device and the third device being a descendant node of the second device, and also causing the second device and at least the third device to communicate through the active second RF link after the third devices receives the RF broadcast schedule generated by the second device, wherein the third device propagates the RF broadcast schedule to other child nodes;
reducing, by the first device, an amount of attempted communications over the first RF link to determine whether the first RF link has reactivated; and reverting data transfer to the second device back to the first RF link when the first RF link is reactivated.

14. The method as in claim 13, wherein reducing the amount of attempted communications over the first RF link to determine whether the first RF link has reactivated comprises using a ratio of probe messages between transmitting the data over the PLC link and attempting to transmit the data over the first RF link to detect RF link recovery.

15. The method as in claim 14, wherein the ratio of probe messages is a count of sending a PLC unicast message divided by a count of sending an RF unicast message, the method further comprising:
   setting the ratio to balance throughput of data transmission and recovery speed of the first RF link.

16. The method as in claim 13, wherein reverting back to the first RF link includes using a sliding window which is a data packet send window configured to revert data transmission back to the first RF link with substantially no jitter.

* * * * *

UNITED STATES PATENT AND TRADEMARK OFFICE
CERTIFICATE OF CORRECTION

PATENT NO. : 11,128,554 B1
APPLICATION NO. : 16/265046
DATED : September 21, 2021
INVENTOR(S) : Yinfang Wang et al.

Page 1 of 1

It is certified that error appears in the above-identified patent and that said Letters Patent is hereby corrected as shown below:

In the Specification

Column 9, Line 36, please amend as shown:
max step ($2^{n+m}$). Once the transmission succeeds on the RF Column 13, Line 34, please amend as shown:
device receives the RF broadcast schedule generated Column 14, Line 22, please amend as shown:
communicate, after the third device receives the RF Column 14, Line 62, please amend as shown:
device receives the RF broadcast schedule generated Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*